(12) United States Patent
Petzel (10) Patent No.: US 9,597,846 B2
(45) Date of Patent: Mar. 21, 2017

(54) METHOD OF TREATING A FIBER CUSHION BODY

(75) Inventor: Jan Petzel, Tübingen (DE)

(73) Assignee: SCHUKRA GERAETEBAU GMBH, Berndorf (AT)

( * ) Notice: Subject to any disclaimer, the term of this patent is extended or adjusted under 35 U.S.C. 154(b) by 407 days.

(21) Appl. No.: 14/119,278

(22) PCT Filed: Jun. 11, 2012

(86) PCT No.: PCT/EP2012/002465
§ 371 (c)(1),
(2), (4) Date: Dec. 26, 2013

(87) PCT Pub. No.: WO2012/167950
PCT Pub. Date: Dec. 13, 2012

(65) Prior Publication Data
US 2014/0167328 A1 Jun. 19, 2014

(30) Foreign Application Priority Data
Jun. 10, 2011 (EP) .................................... 11004795

(51) Int. Cl.
*B29C 70/54* (2006.01)
*B29C 35/02* (2006.01)
(Continued)

(52) U.S. Cl.
CPC .......... *B29C 70/54* (2013.01); *B29C 35/0261* (2013.01); *B29C 35/0266* (2013.01); *B29C 35/045* (2013.01); *B29C 44/358* (2013.01); *D04H 1/541* (2013.01); *D04H 1/542* (2013.01); *D04H 1/736* (2013.01); *B29C 65/08* (2013.01); *B29C 65/561* (2013.01); *B29C 66/0222* (2013.01); *B29C 66/0242* (2013.01);
(Continued)

(58) Field of Classification Search
CPC . B29C 35/0266; B29C 35/0261; B29C 70/54; B29C 65/08
See application file for complete search history.

(56) References Cited

U.S. PATENT DOCUMENTS

| 4,837,881 A | 6/1989 | Kondo et al. |
| 5,843,559 A | 12/1998 | Cadieux et al. |

(Continued)

FOREIGN PATENT DOCUMENTS

| CN | 1210065 | 3/1999 |
| CN | 100409784 | 8/2008 |

(Continued)

OTHER PUBLICATIONS

International Search Report and Written Opinion of the International Searching Authority, International Patent Application No. PCT/EP2012/002465, mailed Aug. 23, 2012 (11 pages).

*Primary Examiner* — Stella Yi
(74) *Attorney, Agent, or Firm* — Michael Best & Friedrich LLP (57) ABSTRACT

A fiber cushion body, which is formed from cross-linked fiber material and which is resiliently deformable when load is applied along a main load direction, is treated using ultrasonic energy. A portion of the fiber cushion body is displaced, for example using a sonotrode, and ultrasonic vibrations are applied to the fiber cushion body to re-shape the fiber cushion body from a first shape to a second shape different from the first shape.

20 Claims, 4 Drawing Sheets

(51) Int. Cl.

| | | |
|---|---|---|
| *B29C 35/04* | (2006.01) | |
| *B29C 44/34* | (2006.01) | |
| *D04H 1/541* | (2012.01) | |
| *D04H 1/542* | (2012.01) | |
| *D04H 1/736* | (2012.01) | |
| *B29C 65/08* | (2006.01) | |
| *B29C 65/00* | (2006.01) | |
| *B29K 105/04* | (2006.01) | |
| *B29K 105/06* | (2006.01) | |
| *B29L 31/58* | (2006.01) | |
| *B29C 65/56* | (2006.01) | |

(52) U.S. Cl.
CPC ............ *B29C 66/474* (2013.01); *B29C 66/69* (2013.01); *B29C 66/71* (2013.01); *B29C 66/7294* (2013.01); *B29C 66/7313* (2013.01); *B29C 66/73755* (2013.01); *B29C 66/742* (2013.01); *B29K 2105/04* (2013.01); *B29K 2105/06* (2013.01); *B29L 2031/58* (2013.01)

(56) References Cited

U.S. PATENT DOCUMENTS

| | | |
|---|---|---|
| 5,971,099 A | 10/1999 | Yasuda et al. |
| 6,077,378 A | 6/2000 | Bullard et al. |
| 6,086,813 A | 7/2000 | Gruenwald |
| 6,122,806 A | 9/2000 | Umezawa et al. |
| 6,226,819 B1 | 5/2001 | Ogawa et al. |
| 6,817,674 B2 | 11/2004 | Fujita et al. |
| 7,275,793 B2 | 10/2007 | Fujita et al. |
| 2005/0269855 A1 | 12/2005 | Flegal et al. |
| 2006/0089071 A1 | 4/2006 | Leidig et al. |
| 2006/0273650 A1 | 12/2006 | Embach |
| 2009/0267401 A1 | 10/2009 | Ito et al. |
| 2011/0068498 A1 | 3/2011 | Ito et al. |

FOREIGN PATENT DOCUMENTS

| | | |
|---|---|---|
| EP | 0 896 079 A1 | 2/1999 |
| EP | 1 674 242 A1 | 6/2006 |
| EP | 2002760 | 12/2008 |
| EP | 2008549 | 12/2008 |
| JP | 7059635 | 3/1995 |

METHOD OF TREATING A FIBER CUSHION BODY

TECHNICAL FIELD

The invention relates to a method of treating a fiber cushion body. The invention relates in particular to such a method which may be used for a post-treatment of a molded fiber cushion body.

BACKGROUND

Foams, such as polyurethane (PU) foams, are widely used as fabric backings for seats, such as for vehicle interior materials in the transportation industry. The foams are adhered to the backs of textile face materials. These foam backed composites have a cushion effect which can offer comfort or a luxurious feel in contact areas.

There are drawbacks to using polyurethane foam as cushioning material for seats. For example, the polyurethane foam backed material can emit volatile materials which contribute to 'fogging' of vehicle or housing interiors, and the foam itself may oxidize over time leading to a color change in the material. Recyclability is also an issue which has to be addressed.

For these and other reasons, there is a continued need for another material that would provide cushion properties similar to the ones of foam materials at similar costs. One class of materials which has received attention in this regard is nonwovens, for example polyester nonwovens. These materials can provide a suitable backing to many face fabrics and address some of the needs which are difficult to address with conventional PU foam cushions.

Methods of producing mats of perpendicular laid, thermally bonded nonwovens, including air laid and "Struto" nonwoven techniques, have strived to provide a cushion with an economical and weight advantage to previous nonwoven technologies. Many of these techniques orient the staple fibers into a vertical position in a two-dimensional layer. By joining plural such pre-formed mats, a fiber cushion body may be formed.

Another technique for manufacturing a three-dimensional fiber cushion body includes inserting loose fiber material into a three-dimensional mold and supplying heat to the fibers inserted into the mold to cause thermal cross-linking. At least a fraction of the fibers may be oriented so as to predominantly align with a pre-defined direction before heat is supplied to the mold. Such techniques have the advantage that, by respectively using an appropriate mold, a great variety of three-dimensional shapes may be formed. However, the working time and, thus, costs required to produce molds may impose constraints on the number of different mold geometries which may be available and, thus, on the number of three-dimensional fiber cushion geometries which may be produced in the molding process.

When the fiber cushion body is formed as a unitary body using a mold, rigid fixation elements may be integrated into the fiber cushion body. Such fixation elements may be used to attach the fiber cushion body to structural members or to attach devices to the fiber cushion body. The fixation elements may be inserted into the mold before heat is supplied to the mold for thermal activation of binding fibers. While the fixation elements can be reliably integrated into the fiber cushion body, the use of such separate fixation elements may make recycling processes more costly.

SUMMARY

In view of the above, there is a continued need in the art for a method of providing a fiber cushion body which addresses some of the above needs. There is in particular a need in the art for a method of providing a fiber cushion body which allows a wide variety of cushion body geometries to be realized without requiring a dedicated mold for each one of the geometries. There is also a need in the art for such a method which allows recycling processes to be carried out more easily when fixation elements are provided.

These and other needs are addressed by a method of treating a fiber cushion body as defined by the independent claim and by a corresponding fiber cushion body. The dependent claims define embodiments.

According to embodiments, ultrasonic energy is applied to a fiber cushion body in a post-processing step after the fiber cushion body has been formed, in order to modify the geometry of the fiber cushion body. This allows geometrical modifications to be made as required for the specific use of the fiber cushion body, without requiring a dedicated mold which provides all geometrical features of the final product. Further, using ultrasonic energy for modifying the geometry of the fiber cushion body, it is also possible to produce compressed zones having an increased density. Such zones may serve as integrated fixation elements formed from the same fiber material as the bulk of the cushion body. This offers advantages as regards recyclability.

According to an aspect, a method of treating a fiber cushion body is provided. The fiber cushion body is formed from cross-linked fiber material. At least a fraction of the fiber material is thermally activatable. Before being treated, the fiber cushion body has a first shape. A portion of the fiber cushion body is displaced and ultrasonic vibrations are applied to the fiber cushion body to re-shape the fiber cushion body from the first shape to a second shape different from the first shape.

In this method, the fiber cushion body is post-processed using ultrasonic techniques. Thereby, geometrical modifications may be made to the fiber cushion body after the fiber cushion body has been molded. This allows a variety of three-dimensional shapes to be realized, starting from fiber cushion bodies having the same first shape prior to the post-treatment. Complex geometries may be realized in a precise way using ultrasonic welding operations.

The fiber cushion body is resiliently deformable when load is applied along a main load direction. As used herein, the terms "first shape" and "second shape" respectively refer to a shape of the fiber cushion body in a rest state in which no load is applied onto the fiber cushion body.

The fiber cushion body may be an integrally molded fiber cushion body. Such an integrally molded fiber cushion body may be formed by inserting fiber material into a mold and supplying heat thereto in order to cause thermal activation of binding fibers. The resulting fiber cushion body is an integral three-dimensional body which does not require separate fiber mats to be joined to each other. By treating such an integrally molded fiber cushion body using ultrasonic energy, structural stability may be enhanced further. An integrally molded fiber cushion body which is formed from loose fiber material in a mold under application of heat, rather than being formed from separate layers of standing fibers which are subsequently joined to each other, does not have sharp zone boundaries. Such sharp zone boundaries would be potential mechanical rupture lines. The integrally molded fiber cushion body post-processed using ultrasonic energy mitigates rupture problems.

The fiber cushion body may be an integral fiber cushion body which exhibits smooth variations in fiber density and/or orientation, rather than sharp transitions at zone boundaries. At least after treatment, the fiber cushion body may include zones which are distinguished in terms of density and/or fiber orientation. The density and/or fiber orientation varies smoothly in a transition zone disposed between the zones having different density and/or fiber orientation.

Using the method, one or plural trimming channels may be produced in the fiber cushion body using a suitably shaped sonotrode. A trim material may be directly welded to the fiber cushion body in the trim channel by ultrasonic welding.

Using the method, fixation points for elements which are to be attached to the fiber cushion body may be generated.

The ultrasonic vibrations may be applied locally to the fiber cushion body. For illustration, the portion of the fiber cushion body may be displaced so as to form a recess in the fiber cushion body, and the ultrasonic vibrations may be applied locally to the fiber cushion body so as to cause thermal activation of the thermally activatable fiber material in the region of the recess. Thereby, a recess may be formed to receive members different from the fiber cushion body.

The portion may be displaced using a sonotrode which is also used to locally apply the ultrasonic vibrations.

A compressed zone, i.e. a zone having increased density, may be generated in the fiber cushion body. The fiber cushion body may have a first density at the portion when the fiber cushion body has the first shape. The displacing and applying of ultrasonic vibrations may be performed such that the fiber cushion body has a second density at a face of the recess after the ultrasonic vibrations have been applied, the second density being greater than the first density. Thereby, a fixation zone made from the same material as the bulk of the fiber cushion body is formed. The fixation zone has increased rigidity for attaching members thereto, but does not require a material different from that of the bulk of the fiber cushion body to be baked into the fiber cushion body. The fixation zone formed of compressed fiber material can hold connectors such as threaded bolts or tree connectors or can serve in another way by offering increased strength in the fiber structure.

The method may include attaching a flexible material, in particular a flexible woven material, to the face of the recess. The flexible material may be trim material. Thereby, the face of the recess may be used as fixation point for trim material.

The flexible material may be thermally activatable. The flexible material may be trim material from polyester fiber. The ultrasonic vibrations may be applied to the flexible material and the fiber cushion body to attach the flexible material to the fiber cushion body by ultrasonic welding. Thereby, the number of components required to attach the flexible material may be reduced. The ultrasonic weld line may be hidden in a trim channel which may be formed by applying ultrasonic vibrations to the fiber cushion body.

The method may include attaching a rigid member to the face of the recess. Thereby, the face of the recess may be used as fixation point for the rigid body. The rigid body may be a component of a climate system, such as a heating or cooling system for heating or cooling a vehicle seat. The rigid body may be a component of a seat adjusting system, such as a power actuator.

A connector may be brought into direct engagement with the face of the recess to attach the rigid member to the face of the recess. With the face having increased density, it is not necessary to provide separate fixation elements molded into the fiber cushion body for engagement with the connector.

The recess may be formed so as to have a section which flares in a direction from a surface of the fiber cushion body towards the interior of the fiber cushion body.

The fiber cushion body may have a main load direction. In at least a zone of the fiber cushion body, fibers may be oriented predominantly along the main load direction. In the zone, more than 50% of the fibers may have an orientation which encloses an angle of less than 45° with the main load direction. Thereby, good resiliency characteristics may be attained.

The fiber cushion body may have a major face which extends transverse to the main load direction. The portion which is displaced may include a section of the major face. The section of the major face may be displaced in a direction parallel to the main load direction to generate the recess. Thereby, a recess may be formed on the face of the fiber cushion body which, for example, corresponds to the B-face in automotive seating. This face is particularly suitable for receiving larger components.

The fiber cushion body may have a minor face extending parallel to the main load direction. The portion which is displaced may include a section of the minor face. The section of the minor face may be displaced in a direction transverse to the main load direction to generate the recess. Thereby, a recess may be formed at a location which is suitable for receiving structural elements.

The ultrasonic vibrations may be applied to the fiber cushion body by a sonotrode while the portion is simultaneously displaced by the sonotrode. Thereby, increased density zones may be generated at side faces and bottom faces of a recess. The ultrasonic vibrations may be applied continuously throughout the displacement of the portion. Applying ultrasonic vibrations may be started before or when the displacement is started.

Applying the ultrasonic vibrations to the fiber cushion body may be started after the portion has been displaced. Thereby, zones having increased density may be generated so as to occupy a smaller surface area, and/or the characteristics of side walls of a recess may be adjusted.

The treated fiber cushion body may be used in a vehicle seat. The treated fiber cushion body may be used in a automotive seat, an aviation seat, a train seat, or a public transportation seat. The treated fiber cushion body may be used in a seat for home or office seating. The method may include mounting the treated fiber cushion body in such a seat.

According to another embodiment, a method of producing a fiber cushion body is provided. In the method, a loose fiber material which includes thermally activatable binding fibers is supplied to a mold. Heat is supplied to the fibers filled into the mold to thermally activate the binding fibers to form a molded fiber cushion body. The molded fiber cushion body is treated using the treating method of any one aspect or embodiment.

In the method, the fiber cushion body is molded. This allows the fiber cushion body to be produced as an integral body, without requiring separate mats of standing fibers to be joined to each other. The term "loose fiber material" as used herein refers to fiber material which is not in the form of a nonwoven or woven fabric. The loose fiber material may also include agglomerations of fibers, such as fiber flocks.

The fiber material may include filling fibers and binding fibers. The filling fibers may have a linear mass density in between 10 and 100 dtex. The binding fibers may have a linear mass density in between 7 and 40 dtex. The filling fibers may have a length of at least 80 mm. Alternatively, filling fiber lengths may be selected to be in a range from 12-70 mm.

The fibers may be oriented prior to supplying heat. Thereby, a fiber cushion body may be formed in which, in at least one zone of the fiber cushion body, the fibers have a preferential direction corresponding to a main load direction of the fiber cushion body. A desired soft feel touch and good breathability of the fiber cushion body may be attained.

The mold may have two major faces on opposite sides of a recess defined therebetween, which may be displaceable relative to each other. By displacing the major faces of the mold relative to each other, the orientation and density of the fiber material may be changed at the major faces of the mold. Thereby, the molded fiber cushion body may be formed with surface zones which are distinguished with regard to density and/or fiber orientation from a resilient zone in which the fibers have a preferential fiber orientation corresponding to the main load direction. Displacing the major faces of the mold relative to each other may also assist in orienting the fibers in a zone of the mold recess where it is desired for the fibers to be oriented along the preferential direction which corresponds to the main load direction, so as to form the resilient zone of the fiber cushion body.

The loose fiber material supplied into the mold may be compressed along a direction parallel to the main load direction prior to supplying the heat. Thereby, zones distinguished from the resilient zone with regard to density and/or fiber orientation may be formed on the major faces of the fiber cushion body. The main load direction of the formed fiber cushion body may generally extend in a direction perpendicular to the major faces of the fiber cushion body. In embodiments, the fiber material inserted into the mold may be compressed along two directions transverse to each other prior to supplying the heat.

Alternatively or additionally, the loose fiber material supplied into the mold may be compressed along a direction perpendicular to the main load direction prior to supplying the heat. Thereby, zones distinguished from the resilient zone with regard to density may be formed on lateral sides of the fiber cushion body.

Alternatively or additionally to locally compressing the fiber material prior to thermal activation of the binding fibers, the fiber material or the fiber cushion body formed therefrom may be locally compressed after thermal activation of the binding fibers. By locally compressing portions of the fiber cushion body subsequent to thermal activation of the binding fibers, for example during the cooling process of the fiber cushion body, it is possible to reduce potential deviations of the fiber cushion body shape from a desired final shape.

According to embodiments, the fibers may be oriented after insertion into the mold. The fibers may be oriented using a gas flow, in particular an air flow.

The loose fiber material may be supplied to the mold in a gas stream. A flow pattern of the gas stream may be controlled to orient the fibers within the mold. The flow pattern of the gas stream may be controlled based on a filling level of the fiber material in the mold. To this end, the mold may be provided with through openings for the gas stream.

To orient the fiber material after insertion into the mold, the location and/or size of an area or of areas at which gas is drawn from the mold may be adjusted based on the filling level. Gas may be drawn from the mold over major faces of the mold, which are spaced along the direction which corresponds to the main load direction. Gas may be drawn from the mold at areas of the major faces of the mold which are respectively disposed lower than a current filling level of the fiber material in the mold.

The fibers may be oriented prior to insertion into the mold. The loose fibers may be deposited on a conveyor and may be oriented while being deposited on the conveyor. Orienting the fibers may be effected using a gas stream, such as an air stream. Other techniques for generating a parallel-laid fiber arrangement on the conveyor can be used. The oriented fibers may then be transferred from the conveyor into the mold such that the fiber orientation is directed along the direction which corresponds to the main load direction in the resulting fiber cushion body.

The fibers may be pre-heated to a temperature below the thermal activation temperature of the binding fibers prior to insertion into the mold. Thereby, the amount of thermal energy which has to be supplied to the fibers after insertion of the fibers into the mold may be decreased.

Heat may be supplied to the fibers in the mold using a stream of warm gas, air or water vapor.

The fiber material may include the binding fibers and filling fibers. The binding fibers may be bi-component (BiCo) fibers. For illustration, the binding fibers may have a core and a coating. The core may be formed from polyester or polyamide. The coating may be formed from polyamide or modified polyesters. The binding fibers may have a trilobal shape in cross-section. The filling fibers may for example be formed from polyamide or polyester. The filling fibers have a melting temperature higher than the thermal activation temperature of the binding fibers. The filling fibers may be straight, helical, crimped, etc., and may be used to fill the volume of the fiber cushion body.

Properties of the fiber cushion body, in particular the rigidity, elasticity or damping behavior of the fiber cushion body, may be controlled in a spatially varying manner. This can be attained by adjusting the composition, the density or the fiber orientation of the fiber material in a spatially varying manner.

The molded fiber cushion body may be removed from the mold prior to the treating it using ultrasonic energy.

According to another aspect, a fiber cushion body produced with a method of an aspect or embodiment is provided.

According to another aspect, a seat including a fiber cushion body produced with a method of an aspect or embodiment is provided.

Embodiments of the invention will be described with reference to the accompanying drawings.

Exemplary embodiments of the invention will now be described with reference to the drawings. While some embodiments will be described in the context of specific fields of application, the embodiments are not limited to this field of application. Further, the features of the various embodiments may be combined with each other unless specifically stated otherwise.

Figure 1:
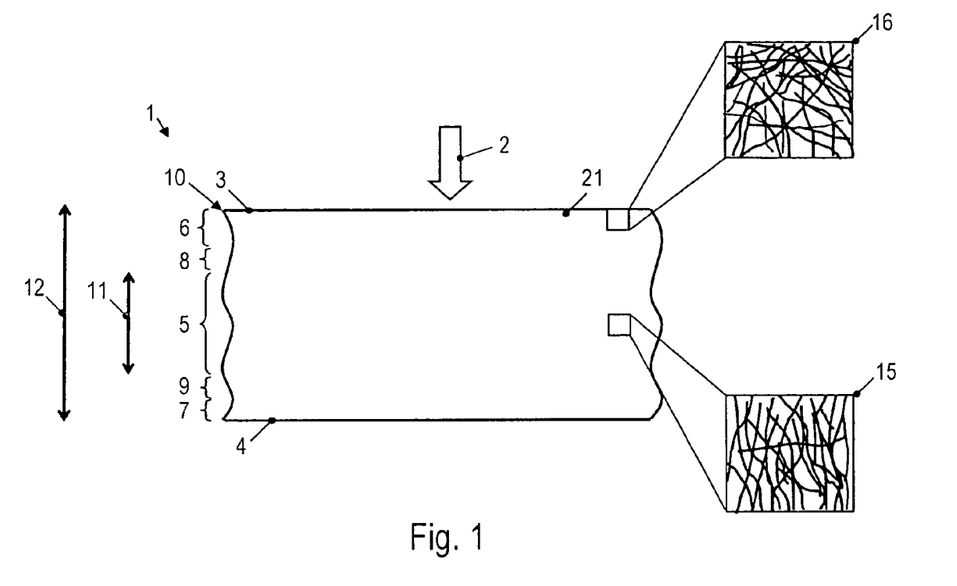
FIG. 1 is a schematic cross-sectional view of a fiber cushion body.
Figure 2:
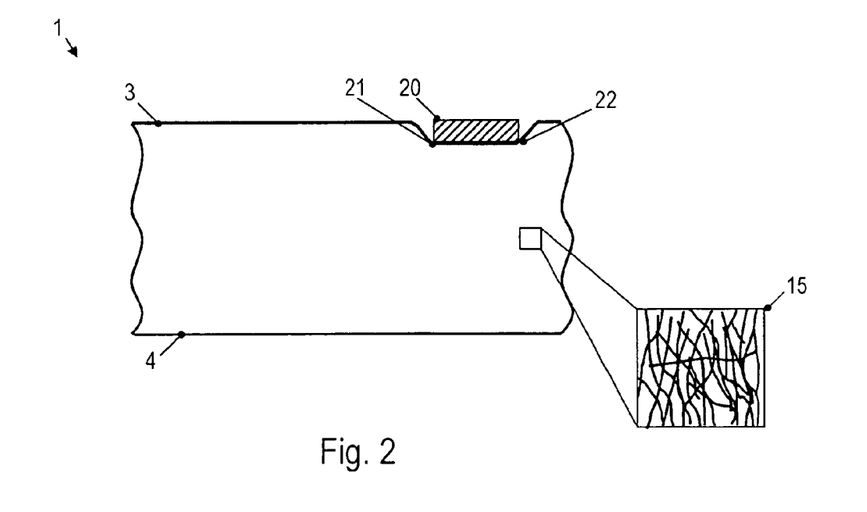
FIGS. 2-4 show the fiber cushion body of FIG. 1 in various stages of a method of treating the fiber cushion body.
Figure 3:
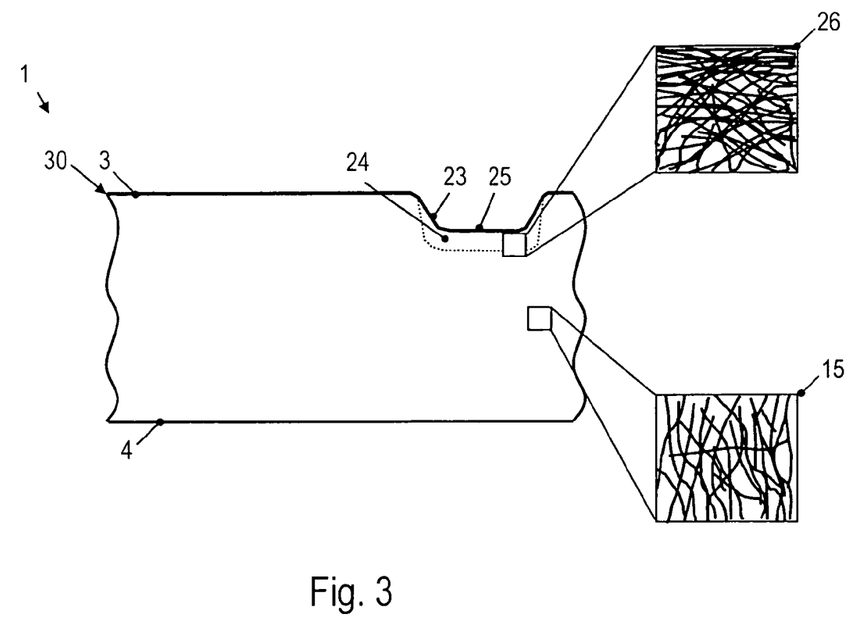
Figure 4:
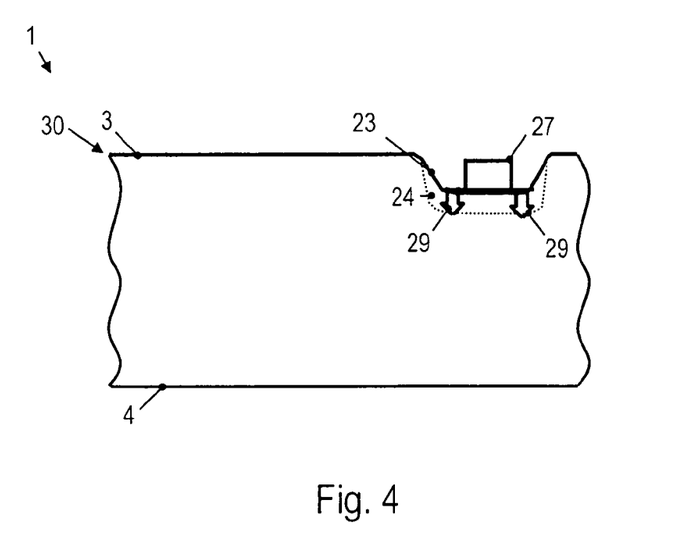

Referring to FIGS. 1-4, a method of treating a fiber cushion body will be explained. FIG. 1 is a schematic cross-sectional view of a fiber cushion body 1 before the fiber cushion body 1 is treated. FIGS. 2-4 show cross-sectional views of the fiber cushion body 1 during or after the treatment method. The cross-sectional views are respectively taken along a plane which is perpendicular to major faces of the fiber cushion body 1 and parallel to a main load direction 2 of the fiber cushion body 1.

Referring to FIG. 1, the fiber cushion body 1 to be treated may be configured for use as a seat cushion. The fiber cushion body is configured to provide resilient characteristics when a force directed along a main load direction 2 is exerted onto the fiber cushion body 1.

The fiber cushion body 1 has two major faces 3, 4 which are arranged so as to be opposite to each other on the fiber cushion body 1. The major faces 3, 4 may have an approximately planar shape, extending essentially perpendicularly to the main load direction 2. The fiber cushion body 1 may be configured such that the main load direction 2 defines a normal to the plane of the major faces 3 and 4.

The fiber cushion body 1 may be a unitary body which is integrally formed from thermally cross-linked fibers. The fiber material forming the fiber cushion body may include at least two different types of fibers, namely a binding fiber and a filling fiber. The binding fiber is a fiber which can be thermally activated by supplying heat thereto. Upon thermal activation, at least a portion of each binding fiber melts, thereby causing a matrix of fibers to form. Various known fiber types may be used as binding and filling fibers. The fiber material from which the fiber cushion body is formed may include fibers that can be obtained from recycling material and/or which can be recycled in an efficient manner. The binding fibers may be bi-component (BiCo) fibers. The binding fibers may have a thermal activation temperature which is lower than a melting temperature of the filling fibers. According to exemplary embodiments, the binding fibers may be BiCo fibers having a core of polyester or polyamide, and having a coating of polyamide or modified polyester. The BiCo fibers may have a trilobal shape in cross-section. The filling fibers may be formed from polyester or polyamide and have a melting temperature higher than at least the melting temperature of the coating of the binding fibers. The filling fibers may have a linear mass density of in between 10 and 100 dtex. The binding fibers may have a linear mass density of in between 7 and 40 dtex. The fiber material from which the fiber cushion body is formed may include more than one type of filling fiber and/or more than one type of binding fiber.

The fiber cushion body to be treated may be formed using any other suitable technique. For illustration, a fiber cushion body formed by joining mats of perpendicular laid fibers may be subjected to the treatment described below.

The fiber cushion body 1 includes a plurality of different zones 5-7. The zones are distinguished from each other with regard to a characteristic fiber orientation and/or a density of the fiber cushion body 1. There are no sharp boundaries between the different zones. Rather, the fiber cushion body 1 exhibits gradual transitions in fiber orientation or fiber cushion body density between the different portions.

The fiber cushion body 1 has a resilient zone 5. The resilient zone 5 has a fiber orientation corresponding to the main load direction 2 of the fiber cushion body. I.e., the preferential direction of the fibers in the resilient zone corresponds to the main load direction 2 and is perpendicular to at least one major face 3 of the fiber cushion body 1. Due to the formation of the fiber matrix, fiber shapes and statistical distributions in fiber orientation, not all fiber fibers will be directed along the main load direction 2 in the resilient portion. The resilient zone 5 may be considered to have a fiber orientation along the main load direction 2 if more than 50% of the fibers are respectively oriented at an angle of less than 45° to the main load direction 2. In other words, in the resilient zone 5, the majority of fibers is disposed at angle of more than 45° relative to the plane of the major face 3.

The fiber configuration in the resilient portion 5 is schematically indicated at the inset 15. As seen in the inset 15, a majority of the fibers in the resilient zone 5 may be oriented at an angle of less than 45° to the main load direction, and the fiber spacing may be sufficiently large so as to allow the fibers to deflect when a load directed along the main load direction 2 is applied onto the fiber cushion body. Cross-linking fibers, which interconnect the fibers which are mainly disposed parallel to the main load direction 2, allow a fiber matrix to be formed in the resilient zone 5.

The fiber cushion body 1 also includes further zones 6, 7 disposed at the major faces 3 and 4, respectively. The further zones 6 and 7, respectively, are distinguished from the resilient zone 5 with regard to at least one of fiber orientation or fiber cushion body density. In the fiber cushion body 1 of FIG. 1, the fibers in the further zones 6 and 7 respectively have a preferential direction parallel to the plane of the major face at which they are disposed. The density of the fiber cushion body at the major faces 3 or 4 may be greater than a density in the resilient zone 5. Alternatively, such an increased density may also be generated in the treatment using ultrasonic energy.

The fiber configuration in the further zone 6 disposed at the major face 3 is schematically indicated at the inset 16. As seen in the inset 16, a majority of the fibers in the zone 6 may be oriented at an angle of less than 45° to the plane of the major face 3, and the fibers may have a packing density greater than in the resilient portion 5. The further zone 7 disposed on the other major face 4 may have a configuration, with regard to fiber orientation and fiber cushion body density, which is similar to the one in the zone 6.

The fiber cushion body 1 may be formed in a unitary manner, and there may be gradual transitions in fiber orientation and density between the resilient zone 5 and the further zones 6 and 7, respectively. The fiber cushion body 1 includes a transition zone 8 which is disposed in between the resilient zone 5 and the further zone 6 on the major face 3. In the transition zone 8, the fiber orientation varies gradually from the fiber orientation of the resilient zone 5 to the fiber orientation of the further zone 6 on the major face 3, and the density of the cushion body varies gradually from the density of the resilient zone to the density of the further zone 6 on the major face 3.

The fiber cushion body 1 includes a transition zone 9 which is disposed in between the resilient zone 5 and the further zone 7 on the major face 4. In the transition zone 9, the fiber orientation varies gradually from the fiber orientation of the resilient zone 5 to the fiber orientation of the further zone 7 on the major face 4, and the density of the cushion body varies gradually from the density of the resilient zone 5 to the density of the further zone 7 on the major face 4.

The fiber cushion body 1 thus formed as a unitary three-dimensional body has a height 12 which may be greater than 4 cm. The resilient zone 5 has a height 11 and be disposed so as to be spaced from both major faces 3 and 4.

In the fiber cushion body 1, the resilient zone 5 having the fiber orientation along the main load direction 2 provides good ventilation and resiliency. With the fiber cushion body 1 being formed in a unitary manner from thermally cross-linked fibers, good durability and comfort are attained. These various characteristics described with reference to FIG. 1 for the fiber cushion body will be retained by the treatment using ultrasonic vibrations which will be described next.

In order to alter the geometry of the fiber cushion body 1, a portion 21 of the fiber cushion body 1 is displaced and ultrasonic vibrations are locally applied to the fiber cushion body 1 in this area. Thereby, thermal activation of binding fibers is attained, resulting in cross-linking. When the fiber cushion body 1 cools down again, the modified shape of the fiber cushion body is fixated. Thereby, the fiber cushion body may be re-shaped from a first shape of the fiber cushion body prior to the treatment, when no load is applied to the fiber cushion body, to a second shape after the treatment, when no load is applied to the fiber cushion body.

FIG. 2 shows the fiber cushion body 1 when the portion 21 originally located in the plane of the major face 3 is displaced. The portion 21 is displaced by a sonotrode 20. The sonotrode 20, which is only schematically shown in FIG. 2, may have any suitable geometry. The geometry of the sonotrode 20 may be selected based on the modification in the shape of the fiber cushion body 1 which is to be made. For illustration, if a trim channel recessed into the fiber cushion body is to be formed, a sonotrode having a narrower cross sectional area may be used to facilitate insertion into the fiber cushion body 1. If a recess is to be formed over a larger area of the fiber cushion body, a sonotrode having greater cross sectional area may be used.

The sonotrode 20 vibrates and applies ultrasonic vibrations onto the portion of the fiber cushion body 1 on which it abuts. The locally supplied ultrasonic energy thermally activates binding fibers, thereby facilitating deformation of the fiber cushion body 1 from the first shape shown in FIG. 1 to a second shape. The cross-linked structure is fixated when the fiber material cools down after the sonotrode 20 is deactivated. The modified shape of the fiber cushion body is thereby fixated.

The sonotrode 20 may continuously apply ultrasonic vibrations to the fiber cushion body 1 while it is depressed into the fiber cushion body 1. Alternatively, activation of the sonotrode 20 may be postponed until after the portion 21 has already been displaced. Depending on the timing at which the sonotrode 20 is activated, recesses having different characteristics may be produced.

By displacing the portion 21 of the fiber cushion body 1 towards the interior of the fiber cushion body 1, the fiber material is locally compressed. By supplying ultrasonic energy in combination with depressing the sonotrode 20 further into the fiber cushion body 1, the original cross-linked fiber network is locally molten and a zone with increased density is formed at a face of the recess formed in the fiber cushion body, which is fixated by the cross-linked fibers when the application of ultrasonic energy is stopped.

FIG. 3 shows the fiber cushion body when the fiber cushion body has the second shape.

By displacing the portion 21 and applying ultrasonic vibrations, the shape of the fiber cushion body 1 is modified from the first shape 10 before treatment as shown in FIG. 1 to the second shape 30. After a portion of the fiber cushion body has been displaced and ultrasonic vibrations have locally been applied, a recess 23 is formed in a face of the fiber cushion body 1.

Owing to the treatment, a zone 24 having increased fiber density is formed in the fiber cushion body 1 adjacent the recess. Dotted lines schematically indicate a characteristic zone in which a density of the fiber cushion body is greater than a bulk density in the resilient zone 5 by at least a given factor. For a fiber cushion body which is molded as an integral body from the fiber material, the density and/or fiber orientation varies continuously from the zone 24 having increased density to the resilient zone 5.

The inset 26 illustrates the fiber orientation and density at a bottom face 25 of the recess 25. The density of the fiber cushion body at the face 25 is greater than the density of the fiber cushion body in the resilient zone 9 shown at 15. The density of the fiber cushion body at the face 25 is also greater than the density at portion 21 before treatment of the fiber cushion body 1, as indicated by inset 16 in FIG. 1.

By treating the fiber cushion body using ultrasonic vibrations, zones of the cushion body may be selectively compressed. The thermal activation of the binding fibers gives rise to thermal interlinking, which fixates the increased density zone when the fiber cushion body 1 is allowed to cool down.

FIG. 4 shows the fiber cushion body when the zone 24 having increased density is used as a fixation element. A member 27 is received in the recess 23. Connectors 29 for the member 27 are directly engaged with the zone 24 of the fiber cushion body. The zone 24 thereby acts as a fixation element for the member 27. The zone 24 is integrated into the fiber cushion body 1 and is formed of the same fiber material as other zones of the fiber cushion body 1. It is not required to integrate fixation elements formed from a material different from the fiber material of the fiber cushion body 1, such as metal fixation elements, into the fiber cushion body.

The member 27 may be a rigid member. The member 27 may be a component of a climate system for heating and/or cooling the seat in which the fiber cushion body 1 is to be installed. The member 27 may be a component of an actuator assembly, such as a power actuator, for adjusting a component of the seat in which the fiber cushion body 1 is to be installed.

Other modifications may be made to the geometry of the fiber cushion body 1. The shape of the sonotrode 20 may be selected based on the desired modification in shape of the fiber cushion body 1. For illustration, if a channel is to be formed in the fiber cushion body which has a width small compared to its length, a sonotrode having a width comparable to the width of the channel may be used.

Members other than a rigid member 27 may also be attached to the zone 24 having increased density. For illustration, the zone 24 of compressed fiber material may be used to attach a trim material. In this case, the recess 24 may be formed as a trim channel which extends along one or several sides of the fiber cushion body 1, so as to allow the trim material to be attached to the fiber cushion body. The location at which the trim material is attached to the fiber cushion body may be recessed in a trim channel which is formed by using a sonotrode to push fiber material in an inward direction while applying ultrasonic vibrations, thereby forming a recess which has at least one face with increased density of the fiber material.

If the trim material is formed of, or includes, thermoplastic fibers, the trim material may be attached to the fiber cushion body using ultrasonic welding. The weld line may be arranged in a trim channel formed as described with reference to FIGS. 2 and 3. Ultrasonic welding of the trim material to the fiber cushion body 1 may be performed in parallel with deforming the fiber cushion body to form a trim channel therein. I.e., ultrasonic vibrations may be applied by a sonotrode to both cause thermal activation of the binding fibers of the fiber cushion body for fixating the zone 24 with increased density, and to fuse the trim material with the fiber cushion body 1.

A wide variety of recesses may be formed in the fiber cushion body using the treatment method according to an embodiment. This allows a wide variety of fiber cushion geometries to be generated in a post-processing operation of the fiber cushion body 1, without requiring a dedicated mold for each one of these geometries.

Figure 5:
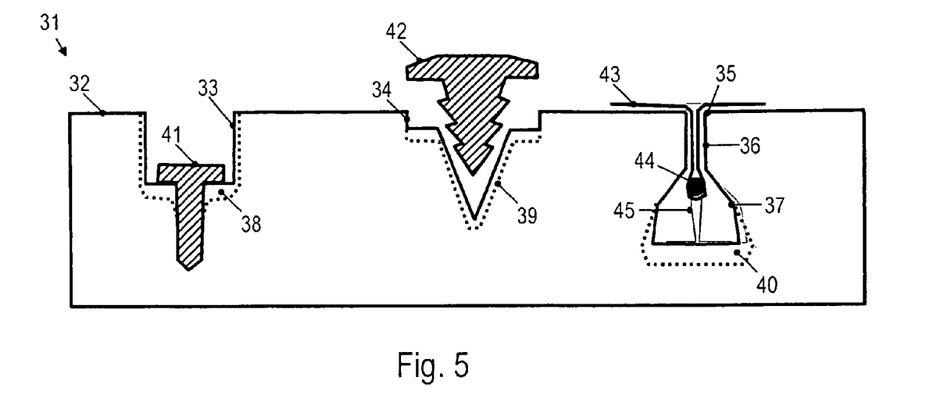
FIG. 5 is a schematic cross-sectional view of a treated fiber cushion body.

FIG. 5 shows a cross-sectional view of another fiber cushion body 31 which has been subjected to a post-processing using a sonotrode to apply ultrasonic vibrations onto the fiber cushion body. A main face 32 of the fiber cushion body 31 includes a plurality of recesses 33-35. The recesses 33-35 may be formed so as to have different shapes. Each one of the recesses 33-35 may be formed by pressing a sonotrode into the fiber cushion body, with the sonotrode locally applying ultrasonic vibrations onto the fiber cushion body 31. The recesses 33-35 may be formed starting from a first shape of the fiber cushion body in which the face 32 is essentially smooth.

A recess 33 may have a cuboid shape. A zone 38 in which the fiber material is compressed so as to provide higher rigidity is formed at the faces of the recess 33. A connector 41, such as a threaded bolt, may be brought into threaded engagement with the zone 38. Such increased density zones at lateral faces of the recess 33 may be formed by supplying ultrasonic energy to the fiber cushion body while simultaneously depressing a sonotrode into the fiber cushion body.

Another recess 34 may have a triangular cross-section. A sonotrode having a corresponding triangular cross-section may be used to form the recess 34. A zone 39 in which the fiber material is compresses so as to provide higher rigidity is formed at the faces of the recess 34. A connector 42, such as a tree connector having an outer diameter larger than an inner diameter of the recess 34, may be brought into engagement with the zone 39.

The connectors 41, 42 may have any one of a variety of functions, such as connecting the fiber cushion body 31 to a structural element or fastening a cover material to the fiber cushion body 31.

Another recess 35 may be formed as a trim channel. The recess 35 may have a first portion 36 which extends to the face 32 of the fiber cushion body 31 and a second portion 37 disposed further away from the face 32. In a plane transverse to the longitudinal axis of the trim channel, the second portion 37 is wider than the first portion 36. I.e., the trim channel includes a section which is flared in a direction from the face 32 towards the interior of the fiber cushion body 31. A zone 40 in which the fiber material is compressed so as to provide higher rigidity is formed at the lower faces of the recess 35. A trim material 43 is attached to the fiber cushion body 31 within the recess 35. The trim material 43 may be attached using a suitable attachment structure disposed within the recess 35. For illustration, a wire 44 and a connector 45 affixing the wire 44 to the bottom face of the recess 35 may be used.

The recess 35 flares in the direction towards the interior of the fiber cushion body, at the transition from the first portion 36 to the second portion 37. Such a recess configuration may be realized by cutting the fiber material at the surface of the fiber cushion body to form the first portion 36 and then forming the second portion 47 using the sonotrode. The first portion 36 may also be formed using the sonotrode.

Figure 6:
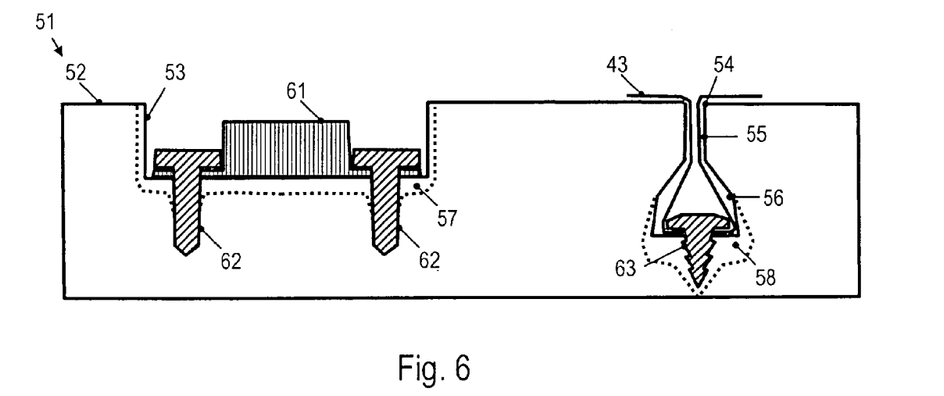
FIG. 6 is a schematic cross-sectional view of another treated fiber cushion body.

FIG. 6 shows a cross-sectional view of another fiber cushion body 51 which has been subjected to a post-processing using a sonotrode to apply ultrasonic vibrations onto the fiber cushion body. A main face 52 of the fiber cushion body 51 includes a plurality of recesses 53 and 54. The recesses 53, 54 may be formed so as to have different shapes. Each one of the recesses 53, 54 may be formed by pressing a sonotrode into the fiber cushion body, with the sonotrode locally applying ultrasonic vibrations onto the fiber cushion body 51. The recesses 53, 54 may be formed starting with a first shape of the fiber cushion body in which the face 52 is essentially smooth.

A recess 53 may have a cuboid shape. A zone 57 in which the fiber material is compresses so as to provide higher rigidity is formed at the faces of the recess 53. A rigid member 61 is received within the recess 53. The rigid member is affixed to the fiber cushion body 51 using connectors 62 which are in direct engagement with the zone 57 having increased density. The rigid member 61 may be a component of a climate system, such as for heating and/or cooling, or a component of an actuator assembly used for actuation a component of the seat in which the fiber cushion body 51 is installed.

Another recess 54 may be formed as a trim channel. The recess 54 may have a first portion 55 and a second portion 56 which flares in a direction from the face 32 towards the interior of the fiber cushion body 51. The recess 54 may be formed as explained with reference to the recess 35 of FIG. 5. A trim cover 43 is attached to the fiber cushion body 52 by direct engagement of a connector 63 with a zone 58 of compressed fiber material formed at the lower faces of the recess 54.

The shape and characteristics of the recesses formed in the fiber cushion body and of the zones of compressed fiber material may be influenced by appropriately timing activation of the sonotrode. For illustration, different surface profiles for the outer shape of the fiber cushion body can be attained depending on whether the sonotrode is activated to apply ultrasonic vibrations to the fiber cushion body as soon as it is pressed against the fiber cushion body, or whether the sonotrode is activated to apply ultrasonic vibrations only after it has already displaced a portion of the fiber material, i.e. after it has been depressed into the fiber cushion body. Similarly, different spatial distributions of the compressed zones formed at the recessed may be attained depending on the timing of sonotrode activation and sonotrode displacement.

Figure 7:
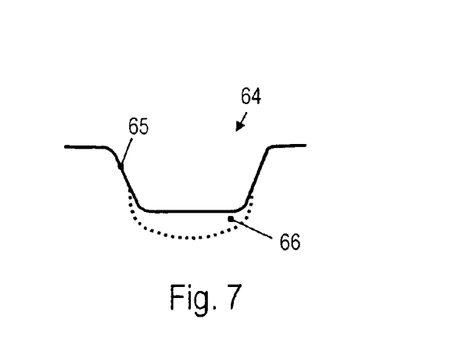
FIGS. 7 and 8 illustrates a recess formed in a treated fiber cushion body.

FIG. 7 illustrates a cross-sectional view of a fiber cushion body which may be formed when the sonotrode is first depressed into the fiber cushion body without applying ultrasonic vibrations and is activated at a later time. Assuming that the sonotrode has a cuboid shape, lateral faces 65 of a recess 64 formed in the surface of the fiber cushion body are more gently inclined, rather than being oriented perpendicular to the face of the fiber cushion body in which the recess 64 is formed. The zone 66 of compressed fiber material is concentrated around the bottom face of the recess 64.

Figure 8:
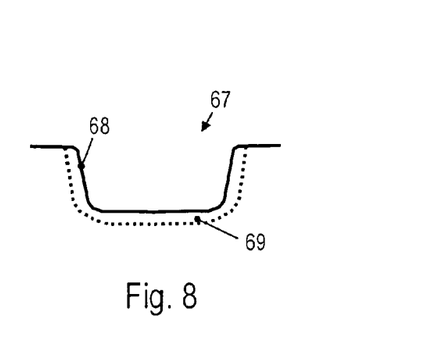

FIG. 8 illustrates a cross-sectional view of a fiber cushion body which may be formed when the sonotrode is activated and applies ultrasonic vibrations while it is being depressed into the fiber cushion body. Assuming that the sonotrode has a cuboid shape, lateral faces 68 of a recess 67 formed in the surface of the fiber cushion body are oriented essentially parallel to the direction in which the sonotrode is depressed into the fiber cushion body. The zone 69 of compressed fiber material extends around the recess 67.

The fiber cushion body which is subjected to the post-treatment may be formed using any technique which is capable of providing a resilient fiber cushion body. For illustration, a fiber cushion body formed by joining plural perpendicular laid layers may be post-processed as described with reference to FIGS. 1-8. The post-processing may particularly advantageously be applied to a fiber cushion body which is an integrally molded body that does not have sharp zone boundaries between layers which need to be joined to each other. For such an integrally molded three-dimensional fiber cushion body, the re-shaping using ultrasonic energy and the creation of integrated fixation elements preserves the structural integrity of the fiber cushion body. Even after the post-treatment, the fiber cushion body may exhibit transition zones in which the density and/or fiber orientation varies continuously from one value to another value within the fiber cushion body.

A method of producing a fiber cushion body according to an embodiment includes forming the fiber cushion body from loose fiber material using a mold and performing the treatment using ultrasonic vibrations. A technique for forming the fiber cushion body from loose fiber material will be explained with reference to FIG. 9. The fiber cushion body thus formed may be subjected to the post-treatment of any one aspect or embodiment described herein.

Figure 9:
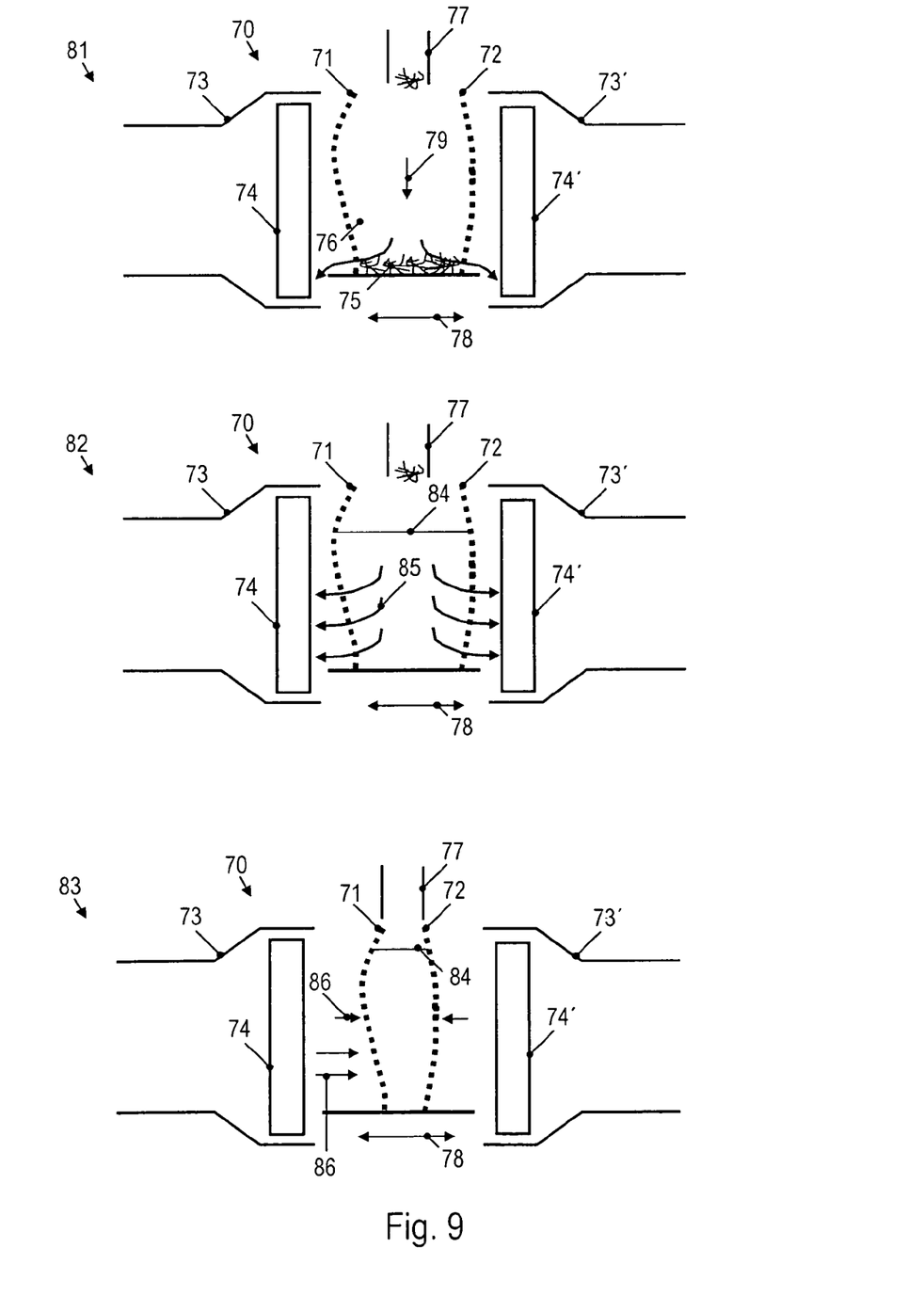
FIG. 9 is a schematic diagram for illustrating molding of a fiber cushion body in a method of producing a fiber cushion body.

FIG. 9 is a schematic representation for explaining a method of producing a fiber cushion body according to an embodiment. The fiber cushion body is formed as a unitary body from a thermally cross-linked fiber material. Various stages of the method are illustrated at 81, 82 and 83.

The method utilizes an apparatus 70 for producing the fiber cushion body. The apparatus 70 includes a mold, which has a first mold 71 and a second mold 72. The first mold 71 and the second mold 72 may respectively be formed from a perforated material, e.g., from perforated metal sheets. The first mold 71 and second mold 72 may have a three-dimensional interior shape which corresponds to the shape of major faces of the fiber cushion body before the post-treatment using ultrasonic energy is performed.

The apparatus 70 further includes gas guiding devices 73 and 73' for drawing gas from a volume defined by the first mold 71 and second mold 72. The gas guiding device 73 may include a controllable guiding assembly 74. The controllable guiding assembly 74 is configured such that gas may be selectively drawn into the gas guiding device 73 over various different areas of the guiding assembly 74. The location and size of the area at which gas is drawn from the volume 76 defined by the first mold 71 and the second mold 72 may be controlled via the guiding assembly 74. Similarly, the gas guiding device 73' may include a controllable guiding assembly 74'. The controllable guiding assembly 74' is configured such that gas may be selectively drawn into the gas guiding device 73' over various different areas of the guiding assembly 74'. The location and size of the area at which gas is drawn into the gas guiding device 73' from the volume 76 defined by the first mold 71 and the second mold 72 may be controlled via the guiding assembly 74'.

The apparatus 70 also includes a supply device 77 to supply fiber material. The supply device 77 may include a tube, which may supply the fiber material entrained in a gas flow into the mold 71, 72. The mold formed by the first mold 71 and the second mold 72 defines a direction 78 along which the first and second moldy 71, 72 are spaced. The direction 78 corresponds to the main load direction of the fiber cushion body which is formed using the method.

At 81, the first mold 71 and second mold 72 are disposed at a first distance. Loose fiber material, which includes binding fibers and filling fibers, is supplied into the mold 71, 72 via the supply device 77. The loose fiber material may be supplied in the form of fiber flocks. The fiber material is entrained in a gas stream 79, which is supplied to the mold 71, 72. When the fiber material is supplied into the mold 71, 72 so as to cover the mold bottom, gas may be drawn into the gas guiding devices 73 and 73' at locations which are generally disposed at the lower end of the molds 71, 72.

At a later stage illustrated at 82, fiber material has been filled into the mold up to a level 84. At this stage, fiber material may still be supplied into the mold 71, 72 via the supply device 77. The fiber material may be entrained in a gas stream supplied by the supply device 77. Gas may be drawn into the gas guiding devices 73 and 73' at locations which are generally disposed lower than the filling level 84 of the mold. As the filling level 84 rises, the location at which gas is drawn from the volume enclosed by the molds 71 and 72 may be controlled using the controllable guiding assemblies 74 and 74', respectively. For illustration, the guiding assemblies 74 and 74' may respectively include a plurality of flaps which are spaced from each other at least along the vertical direction, and flaps may be opened and closed in a controlled manner depending on the filling level 84. Using the controllable guiding assemblies 74 and 74', the flow pattern 85 of a gas stream may be controlled.

The gas stream 85 may be controlled such that the gas stream passing through the mold has a velocity component along the direction 78, which corresponds to the main load direction of the formed fiber cushion body. The gas stream may be controlled such that, at least in a part of the volume 76 enclosed by the first and second molds 71, 72, the velocity component of the gas stream 85 parallel to the direction 78 is much greater than the velocity component which is perpendicular to the direction 78 and which extends parallel to the major faces (i.e., the velocity component which is perpendicular to the drawing plane in FIG. 9).

By controlling a flow pattern of the gas stream such that it passes through the fiber material deposited in the mold with a significant velocity component parallel to the direction 78, fibers may be oriented in the mold such that they have the direction 78 as a preferential direction.

At 83, fiber material has been filled into the mold up to a level 84, and no further fiber material is supplied. The first mold 71 and the second mold 72 are displaced relative to each other along the direction 78, as illustrated at 86. The first mold 71 and the second mold 72 may be displaced relative to a laboratory frame of reference. By displacing the first mold 71 and the second mold 72 relative to each other, portions of enhanced density may be formed within the volume 76 enclosed by the first and second molds 71, 72. Displacing the first mold 71 and the second mold 72 relative to each other may also assist in establishing a fiber orientation parallel to the inner surfaces of the first mold 71 and the second mold 72 in a region adjacent to the inner surfaces, and/or in establishing a fiber orientation parallel to the direction 78 in a portion of the volume 76 which is spaced from the inner surfaces of the first mold 71 and the second mold 72.

After the first mold and the second mold have been displaced relative to each other, so as to establish a desired profile in fiber orientations or in density within the fiber material disposed within the mold, heat may be supplied to the fiber material. By supplying heat, the binding fibers may be thermally activated. A fiber matrix of thermally cross-linked fibers may be formed by thermal activation of the binding fibers.

Heat for thermal activation of the binding fibers may be supplied in various ways. As illustrated at 83 in FIG. 9, a stream 86 of hot gas may be supplied into the mold. The gas guiding devices 73 and 73' may be used to direct the hot gas to portions of the fiber material disposed within the mold 71, 72 in a defined manner. The amount of hot gas supplied to various regions within the mold 71, 72 may be controlled based on, for example, the density or thickness of the fiber cushion body in the respective regions.

The fiber material may be pre-heated to elevated temperatures, which are lower than the thermal activation energy of the binding fibers, when the fiber material is inserted into the mold. Thereby, the amount of energy required to thermally activate the binding fibers after the mold has been filled up to a desired level may be reduced.

The fiber cushion body formed within the mold 71, 72 may be allowed to cool down. Another stream of gas, such as gas having room temperature or gas cooled to a temperature below room temperature, may be guided through the fiber cushion body formed within the mold 71, 72.

One heating process is sufficient to produce the three-dimensional fiber cushion body from loose fiber material, when using the method illustrated in FIG. 9. This is in contrast to methods in which plural sheets of perpendicular laid fibers are stacked and bonded to each other. Generally, plural heating steps are required to produce the sheets of perpendicular laid fibers and bonding them to form a cushion.

Additional processing steps may be performed in the method. For illustration, after forming the three-dimensional fiber cushion body in the mold 71, 72, the fiber cushion body may be inserted into an auxiliary mold to modify the fiber cushion body geometry, or to further solidify or smoothen its exterior surface. The fiber cushion body may be inserted into the auxiliary mold while it is still at elevated temperatures or the auxiliary mold may be heated.

Portions having a density greater than a density of the resilient portion may be selectively formed by controlling the density of fiber material supplied into the mold as a function of supply position, by selectively compressing the fiber material supplied into the mold, or by post-processing. For illustration, a heated tool my be used to locally increase the density of the fiber cushion body after it has been removed from the mold 71, 72. Thereby, a portion of the fiber cushion body may be provided with a high density, so that a seat cover material can be fastened on the fiber cushion body at the high density portion.

The fiber material supplied into the mold may be compressed not only in one direction, but rather along several directions. As shown at 83, the first mold 71 and the second mold 72 may be displaced relative to each other in order to produce regions having a higher density in the fiber material, the higher density regions being disposed along the inner surfaces of the first mold 71 and the second mold 72.

Subsequently, the fiber material which has been inserted into the mold may be compressed on minor lateral faces of the fiber cushion body. To this end, moveable pushers may be displaced in a direction perpendicular to the direction 78, which corresponds to the main load direction of the fiber cushion body.

After the fiber material has been compressed in at least two directions, heat may be supplied to the fiber material so as to cause thermal activation of the binding fibers.

The method may also include compressing the fiber material inserted into the mold in at least three orthogonal directions prior to supplying heat to the fiber material.

After the fiber cushion body is removed from the mold, it is post-processed using ultrasonic energy, as described with reference to FIGS. 1-8.

While methods according to various embodiments have been described, modifications may be implemented in other embodiments. For illustration, while a post-processing of molded fiber cushion bodies has been described, the fiber cushion body which is to be subjected to the post-processing may be formed with any other technique, such as by heat-fusing layers of standing fibers which have previously been formed using Struto- or aid laid techniques.

For further illustration, the fiber cushion body does not need to consist exclusively of thermally cross-linked fibers. In exemplary embodiments, adhesive material may be selectively supplied into the mold when the fiber cushion body is formed, so that the adhesive material is concentrated at pre-defined locations within the cavity defined by the mold. The adhesive material may be selectively supplied to locally enhance the density of bonds between fibers.

While methods of producing a fiber cushion body which is subsequently treated using ultrasonic energy have been described in which the fibers are oriented after insertion into the mold, fibers oriented along a preferential direction may also be formed prior to inserting the fibers into the mold.

The methods according to embodiments may be used for producing fiber cushion bodies which can be integrated into a wide variety of seats. Exemplary seats in which the fiber cushion bodies may be used include automobile seats, train seats, aircraft seats, seats for home use and seats for office use. The fiber cushion bodies may further be used on various components of the seat. For illustration, a fiber cushion body may be used at a seat portion which receives a person's thighs, at a backrest portion supporting a person's back, or at a headrest portion or other component where cushioning is desired.

The invention claimed is:

1. A method of treating a fiber cushion body, said fiber cushion body being formed from cross-linked fiber material, at least a fraction of said fiber material being thermally activatable, said fiber cushion body being resiliently deformable when a load is applied along a main load direction, said fiber cushion body having a first shape before being treated, the fiber cushion body comprising a resilient zone in which more than 50% of the fibers are respectively oriented at an angle of less than 45° to the main load direction and at least one further zone disposed at a major face of the fiber cushion body and distinguished from the resilient zone with regard to both fiber orientation and density, the method comprising:
displacing a portion of said fiber cushion body; and
applying ultrasonic vibrations to said fiber cushion body to re-shape said fiber cushion body from said first shape to a second shape different from said first shape.

2. The method of claim 1, wherein displacing said portion includes displacing so as to form a recess in said fiber cushion body, and wherein applying said ultrasonic vibrations includes applying locally to said fiber cushion body so as to cause thermal activation of said thermally activatable fiber material.

3. The method of claim 2, wherein said portion has a first density when said fiber cushion body has said first shape, and wherein said fiber cushion body has a second density at a face of said recess after said ultrasonic vibrations have been applied, said second density being greater than said first density.

4. The method of claim 3, further comprising attaching a flexible material to said face of said recess.

5. The method of claim 4, wherein the flexible material is a flexible woven material.

6. The method of claim 4, wherein said flexible material is thermally activatable, and wherein said ultrasonic vibrations are applied to said flexible material and said fiber cushion body to attach said flexible material by ultrasonic welding.

7. The method of claim 3, further comprising attaching a rigid member to said face of said recess.

8. The method of claim 7, further comprising bringing a connector into direct engagement with said face of said recess to attach said rigid member to said face of said recess.

9. The method of claim 2, wherein said recess is formed so as to have a section which flares towards the interior of the fiber cushion body.

10. The method of claim 1, wherein said fiber cushion body has a major face extending transverse to said main load direction, wherein said portion which is displaced includes a section of said major face, said section of said major face being displaced in a direction parallel to said main load direction to form said recess.

11. The method of claim 1, wherein said fiber cushion body has a minor face extending parallel to said main load direction, wherein said portion which is displaced includes a section of said minor face, said section of said minor face being displaced in a direction transverse to said main load direction to generate said recess.

12. The method of claim 1, wherein applying said ultrasonic vibrations includes applying to said fiber cushion body by a sonotrode while said portion is simultaneously displaced by said sonotrode.

13. The method of claim 1, wherein applying said ultrasonic vibrations includes applying to said fiber cushion body after said portion has been displaced.

14. The method of claim 1, wherein said fiber cushion body is a seat cushion.

15. The method of claim 14, further comprising installing said treated fiber cushion body in a vehicle seat.

16. A method of producing a fiber cushion body, the method comprising:
   supplying a loose fiber material including fibers of at least two different types into a three-dimensional mold, said fibers including thermally activatable binding fibers;
   supplying heat to said fibers filled into said mold to thermally activate said binding fibers to form a molded fiber cushion body, the fiber cushion body comprising a resilient zone in which more than 50% of the fibers are respectively oriented at an angle of less than 45° to the main load direction and at least one further zone disposed at a major face of the fiber cushion body and distinguished from the resilient zone with regard to both fiber orientation and density;
   displacing a portion of said fiber cushion body; and
   applying ultrasonic vibrations to said fiber cushion body to re-shape said fiber cushion body from a first shape to a second shape different from said first shape.

17. The method of claim 16, wherein supplying said loose fiber material includes supplying in a gas stream, a flow pattern of said gas stream being controlled to orient said fibers within said mold.

18. A fiber cushion body formed from cross-linked fiber material, at least a fraction of the cross-linked fiber material being thermally activatable, the fiber cushion body being resiliently deformable in response to a load being applied along a main load direction, wherein the fiber cushion body includes a resilient zone in which more than 50% of the fibers are respectively oriented at an angle of less than 45° to the main load direction and at least one further zone disposed at a major face of the fiber cushion body and distinguished from the resilient zone with regard to both fiber orientation and density, wherein a transition zone is disposed between the resilient zone and the at least one further zone, wherein the density of the fiber cushion body varies gradually within the transition zone, and wherein a portion of the fiber cushion body is configured to be displaced and to be re-shaped from a first shape to a second shape different than the first shape in response to an application of ultrasonic vibrations.

19. A fiber cushion body formed of fibers of at least two different types and having a resilient zone in which more than 50% of the fibers are respectively oriented at an angle of less than 45° to the main load direction and at least one further zone disposed at a major face of the fiber cushion body and distinguished from the resilient zone with regard to both fiber orientation and density, the fiber cushion body produced by a method comprising:
   supplying a loose fiber material including the fibers of at least two different types into a three-dimensional mold, the fibers including thermally activatable binding fibers;
   supplying heat to the fibers filled into the mold to thermally activate the binding fibers to form a molded fiber cushion body;
   displacing a portion of the fiber cushion body; and
   applying ultrasonic vibrations to the fiber cushion body to re-shape the fiber cushion body from a first shape to a second shape different from the first shape.

20. The method of claim 1, wherein a transition zone is disposed between the resilient zone and the at least one further zone, wherein the density of the fiber cushion body varies gradually within the transition zone.

* * * * *